United States Patent
Quinn et al.

(10) Patent No.: US 6,760,045 B1
(45) Date of Patent: Jul. 6, 2004

(54) SIMULTANEOUS PROJECTED PRESENTATION OF CLIENT BROWSER DISPLAY

(75) Inventors: Bradley J. Quinn, Corona, CA (US); Kent M. Bowling, Foothill Ranch, CA (US)

(73) Assignee: Gateway, Inc., Poway, CA (US)

(*) Notice: Subject to any disclaimer, the term of this patent is extended or adjusted under 35 U.S.C. 154(b) by 490 days.

(21) Appl. No.: 09/751,252

(22) Filed: Dec. 29, 2000

Related U.S. Application Data (60) Provisional application No. 60/184,064, filed on Feb. 22, 2000.

(51) Int. Cl.[7] .................................................. G09G 5/00
(52) U.S. Cl. ........................ 345/744; 345/730; 345/731; 345/732; 345/748; 345/749; 715/501.1; 715/513
(58) Field of Search ................................. 345/730–732, 345/733, 744, 748, 749, 760; 715/501.1, 513

(56) References Cited

U.S. PATENT DOCUMENTS

| | | | |
|---|---|---|---|
| 5,668,566 A | | 9/1997 | Yen |
| 5,809,247 A | | 9/1998 | Richardson et al. |
| 5,838,912 A | | 11/1998 | Poon et al. |
| 5,861,883 A | | 1/1999 | Cuomo et al. |
| 5,924,013 A | * | 7/1999 | Guido et al. .................. 725/67 |
| 5,944,791 A | | 8/1999 | Scherpbier |
| 5,956,487 A | * | 9/1999 | Venkatraman et al. ...... 709/218 |
| 5,991,796 A | | 11/1999 | Anupam et al. |
| 6,006,241 A | | 12/1999 | Purnaveja et al. |
| 6,032,202 A | * | 2/2000 | Lea et al. ....................... 710/8 |
| 6,058,424 A | | 5/2000 | Dixon et al. |
| 6,155,840 A | | 12/2000 | Sallette |
| 6,388,654 B1 | * | 5/2002 | Platzker et al. ............. 345/156 |
| 6,437,786 B1 | * | 8/2002 | Yasukawa .................... 345/474 |
| 6,560,637 B1 | * | 5/2003 | Dunlap et al. ............... 709/204 |

* cited by examiner

Primary Examiner—Kristine Kincaid
Assistant Examiner—Gary Nguyen
(74) Attorney, Agent, or Firm—Scott Charles Richardson; Kevin E. West; Suiter-West (57) ABSTRACT

A system and method for displaying content accessed by a client to an audience via a projector is disclosed, wherein the content includes a client version suitable for access by clients and a projector version suitable for display by a projector. The system includes a server coupled to the network capable of communication with the clients via the network and at least one projector capable of accessing the projector version of the content communicatively coupled to the server. Upon receiving a request from a client that one or more projectors display content accessed by the client, that is "follow" the display of content by that client, the server thereafter monitors the browsing activity of the client, detecting when the client is accessing content via the network. When the client accesses the client version of the content, the server notifies the following projector(s) to access the projector component of the content via the network so the content may be displayed by the projector.

13 Claims, 8 Drawing Sheets

SIMULTANEOUS PROJECTED PRESENTATION OF CLIENT BROWSER DISPLAY

CROSS REFERENCE TO RELATED APPLICATIONS

The present application claims the benefit under 35 U.S.C. § 119(e) of U.S. Provisional Application Serial No. 60/184,064 filed Feb. 22, 2000. Said U.S. Provisional Application Serial No. 60/184,064 is herein incorporated by reference in its entirety.

FIELD OF THE INVENTION

The present invention generally relates to systems and methods for presenting a display of content to an audience, and more particularly to a system and method for presenting a display of content accessed via a network such as the Internet, or the like, by one or more clients simultaneously with client browsing.

BACKGROUND OF THE INVENTION

As use of the Internet becomes ubiquitous, presentations to groups involving the display of material on a web browser are becoming increasingly commonplace. In numerous situations, it is desirable to present a projection of a client's display of content at the same time the client is browsing. In addition, in some circumstances it may be desirable to present a projection of a display of content from a designated at least one of a plurality of clients at any given time simultaneously with browsing by the client.

Simultaneous public display of content could be emulated by, for example, creating a single client application (e.g., a slide show) that emulates the behavior of client browsing, and then displaying that single client application publicly. Emulation, however, does not provide actual display of individual browser behavior under client control. Thus, emulation would not be a satisfactory solution where part of the value of the demonstration arises from observing content on an individual browser under actual client control.

Actual simultaneous public display could be achieved by operatively connecting a projector to a client system. Such solution, though, has limitations in requiring each client machine for which a display is desired to be operatively coupled to a projector at the time display is desired. In addition, such solution may not even be possible in cases where a particular client machine is limited in one way or another such that a projector may not be attached (e.g. where the client machine has no suitable output for sending the display of content to a projector).

With the proliferation of small hand held devices such as cellular telephones, palm computers, Web tablets, and the like capable of Internet access, it may be undesirable to project the same display of content provided by the client device. This is because the simplified display of content provided by such devices, due to their limited display capability, may be unsuitable or undesirable for large public display via a projector.

Consequently, it would be advantageous to provide a system and method for simultaneously projecting a display of content from a client without requiring the client to be directly operatively coupled to a projector wherein the display of content provided by that client device is not suitable, or is undesirable, for public presentation.

SUMMARY OF THE INVENTION

Accordingly, the present invention is directed to a system and method for the presentation of a display of content from at least one of a plurality of clients wherein the client is not required to be directly operatively coupled to a projector and wherein the display of content by that client device may not be not suitable, or desirable, for presentation to an audience.

In accordance with a first aspect of the invention, a system for displaying content accessed by a client to an audience via a projector is disclosed, wherein the content includes a client version suitable for access by clients and a projector version suitable for display by a projector. In an exemplary embodiment, the system includes a server coupled to the network capable of communication with the clients via the network and at least one projector capable of accessing the projector version of the content communicatively coupled to the server. Upon receiving a request from a client that one or more projectors display content accessed by the client, that is "follow" the display of content by that client, the server thereafter monitors the browsing activity of the client, detecting when the client is accessing content via the network. When the client accesses the client version of the content, the server notifies the following projector(s) to access the projector component of the content via the network so the content may be displayed by the projector.

In accordance with a second aspect of the invention, a method for displaying content accessed by a client through a network via a projector is disclosed, wherein the content includes a client version suitable for access by clients and a projector version suitable for display by a projector. In an exemplary embodiment, a client provides a request to the server that one or more projector(s) display content accessed by the client, that is "follow" the display of content by that client. The server thereafter monitors the browsing activity of that client for detecting when the client is accessing content via the network. When the client accesses content via the network, for example, the client version of that content, the server notifies the following projector(s) that the client is accessing the content. The following projector(s) access the projector version of the content via the network whereupon the content may be displayed by the projector(s).

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1A:
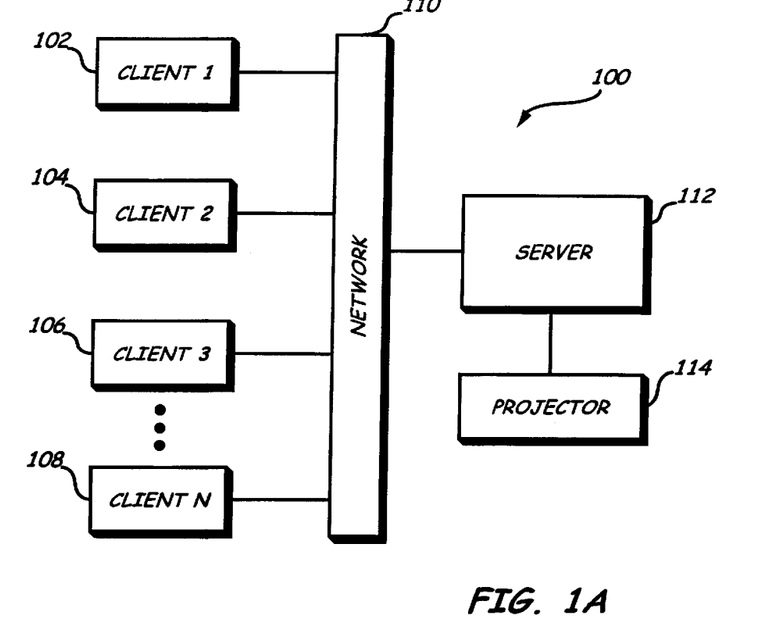
FIG. 1A is a block diagram generally illustrating a system in accordance with an exemplary embodiment of the present invention comprised of multiple clients and a single and a combined server and projector.
Figure 1B:
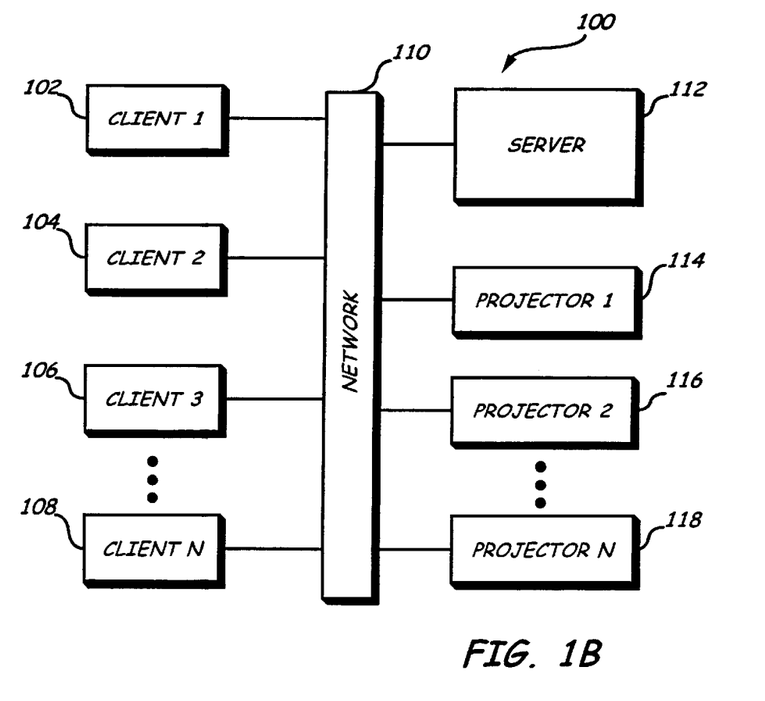
FIG. 1B is a block diagram generally illustrating a system in accordance with an exemplary embodiment of the present invention comprised of multiple clients and multiple projectors interconnected via a network.
Figure 1C:
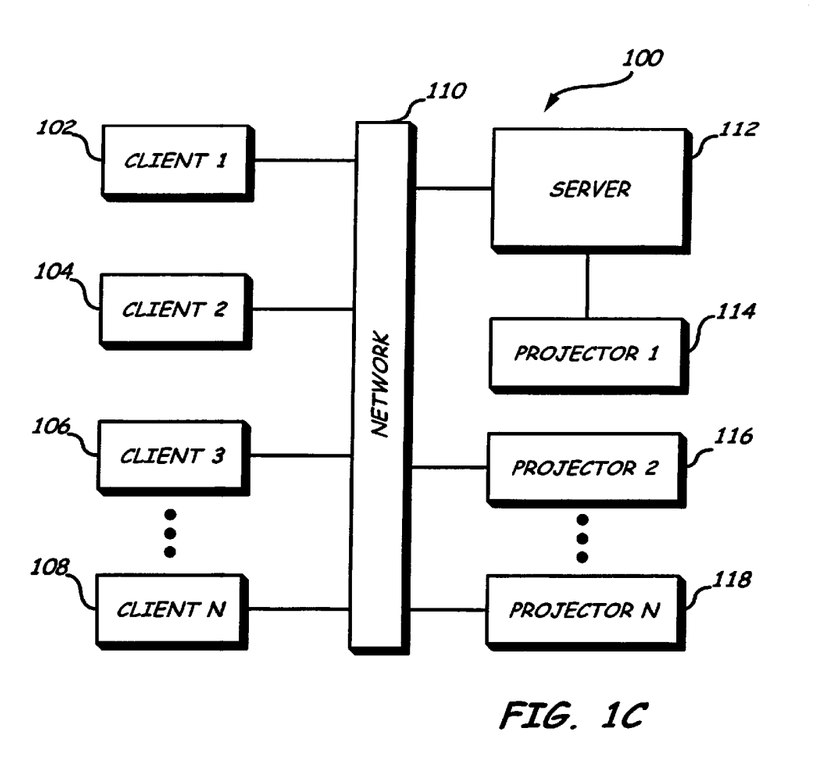
FIG. 1C is a block diagram generally illustrating a system in accordance with an exemplary embodiment of the present invention comprised of multiple clients and multiple projectors wherein the server included an attached projector.

Referring now to FIGS. 1A, 1B and 1C, a system in accordance with an exemplary embodiment of the present invention is shown. The system 100 includes one or more devices 102, 104, 106 & 108 that are operatively coupled as clients via a network 110 to server 112. In exemplary embodiments, client devices 102, 104, 106 & 108 may be any type of information appliance capable of supporting a browser application for accessing content via the network 110. For example, client devices 102, 104, 106 & 108 may comprise any of information handling systems such as desktop personal computers, laptop computers, palm computers, or the like; Web appliances such as Web pads, Web television systems, or the like; Internet capable cellular telephones, or like devices capable of supporting a Web browser for accessing content (e.g., Web pages, graphics, documents, and the like) on the World Wide Web (WWW) via the Internet. In such embodiments, server 112 would be comprised of a Web server utilizing a protocol such as Hypertext Transfer Protocol (HTTP) for serving up Web pages comprising Hypertext Markup Language (HTML) documents and any associated graphics, files and scripts as requested by the client devices 102, 104, 106 & 108. Such client devices 102, 104, 106 & 108 (e.g., Web pads, palm computers, Internet capable cellular telephones, and the like) may have somewhat limited display capabilities due, at least in part, to their small size, portability, or low cost. Thus, content accessed by such devices may be limited in size, graphic content, color content, or the like so that it may be adequately displayed to the user.

Projectors 114, 116 & 118 comprise devices capable of providing a display of content to an audience. It will be appreciated the term "projector" as used herein should not be limited to projection devices such as Cathode Ray Tube (CRT) projectors, liquid crystal display (LCD) overhead projectors, and the like, but instead is meant to encompass any display technology capable of providing a display of content to an audience. Such display technologies may include, but should not be limited to, CRT monitors, LCD monitors, and light emitting polymer (LEP) monitors. As shown in FIG. 1A, projectors 114, 116 & 118 may be operatively coupled directly to server 112. For instance, one or more projectors, such as projector 114, may be operatively coupled as a peripheral of server 112. In such embodiments, the projector 114 may be a physically separate apparatus from the server 112, or, alternately, may be physically implemented as part of the server 112. In other embodiments of the invention, as shown in FIG. 1B, one or more projectors 114, 116 & 118 may be operatively coupled to server 112 and clients 102, 104, 106 & 108 via network 10. In this manner, both the client devices 102, 104, 106 & 108 and projectors 114, 116 & 118 may be physically separated from the server 112, and each other. In further embodiments of the invention, as shown in FIG. 1C, projectors may be both operatively coupled to server 112 via network 110 and directly physically connected to the server 112, for example as a peripheral. Projectors 114, 116 & 118, like client devices 102, 104, 106 & 108, may be comprised of an information appliance capable of supporting a browser application for accessing content via the network 110. The hardware architecture of such an information appliance is described, infra, in the discussion of FIG. 12.

As discussed, supra, client devices 102, 104, 106 & 108 each include browsers for accessing the network 110 via server 112 allowing them to navigate to and display various content pages. In accordance with an exemplary embodiment of the present invention, one or more of the clients 102, 104, 106 & 108 may select one or more projectors 114, 116 & 118 to "follow" this navigation by displaying the same or corresponding content as the clients' browsers. For example, wherein the content comprises Web pages on the World Wide Web (WWW) accessed from the Internet 110 via a Web server 112, the following projectors 114, 116 & 118 would display the same HTML document(s) as the client or some other HTML document(s) that corresponds to the client HTML document(s).

Because client devices 102, 104, 106 & 108 may have somewhat limited display capabilities due, at least in part, to their small size, portability, or low cost, content accessed by such devices may be limited in size, graphic content, color content, or the like so that it may be adequately displayed to the user. Further, the content accessed by such devices may include material that the user does not want displayed by the projector. For example, the display of content by a client 102, 104, 106 & 108 may include speaker notes that the client's user does not want displayed by the following projector. By way of the present invention, under circumstances described more fully below, server 112 causes content displayed on client devices 102, 104, 106 & 108 to be presented for display by one or more of projectors 114, 116 & 118 even when the display of content provided by that client device, due to its limited display capabilities, is not suitable, or is undesirable, for public presentation. Consequently, in accordance with the present invention, the content accessed by the client and server may include one or more client versions suitable for access by clients 102, 104, 106 & 108 and one or more projector versions suitable for display by projectors 114, 116 & 118. For example, in embodiments of the invention, the client version of the content may have a reduced graphic content, may lack frames, and/or may include material that the user does not want displayed by the following projectors, while the projector version of the content has a more complete graphic content, increased color content, utilizes frames, and/or has client user material deleted therefrom making it more suitable for display to an audience. Preferably, the content identifier or name is modified to identify the content as either the client version or the projector version. Thus, for example, the client version of a Web page comprised of an HTML/ASP file identified with a URL (Uniform Resource Locator) of "content_page.asp" could be identified as "client_content_page.asp," "c_content page.asp," "client1_content_page.asp," or the like, while the projector version of this page may be identified as "projector_content_page.asp," "p content_page.asp," "projector1_content_page.asp," or the like. Alternately, the client versions of content pages may be placed in one directory on a server, while the projector versions of these content pages are placed in a second directory on that server or a second server. Thus, for the HTML/ASP file having the URL "content_page.asp" in the example above, the client version could be stored as "client/content_page.asp," while the projector version of the content could be stored as "projector/content_page.asp."

Figure 2:
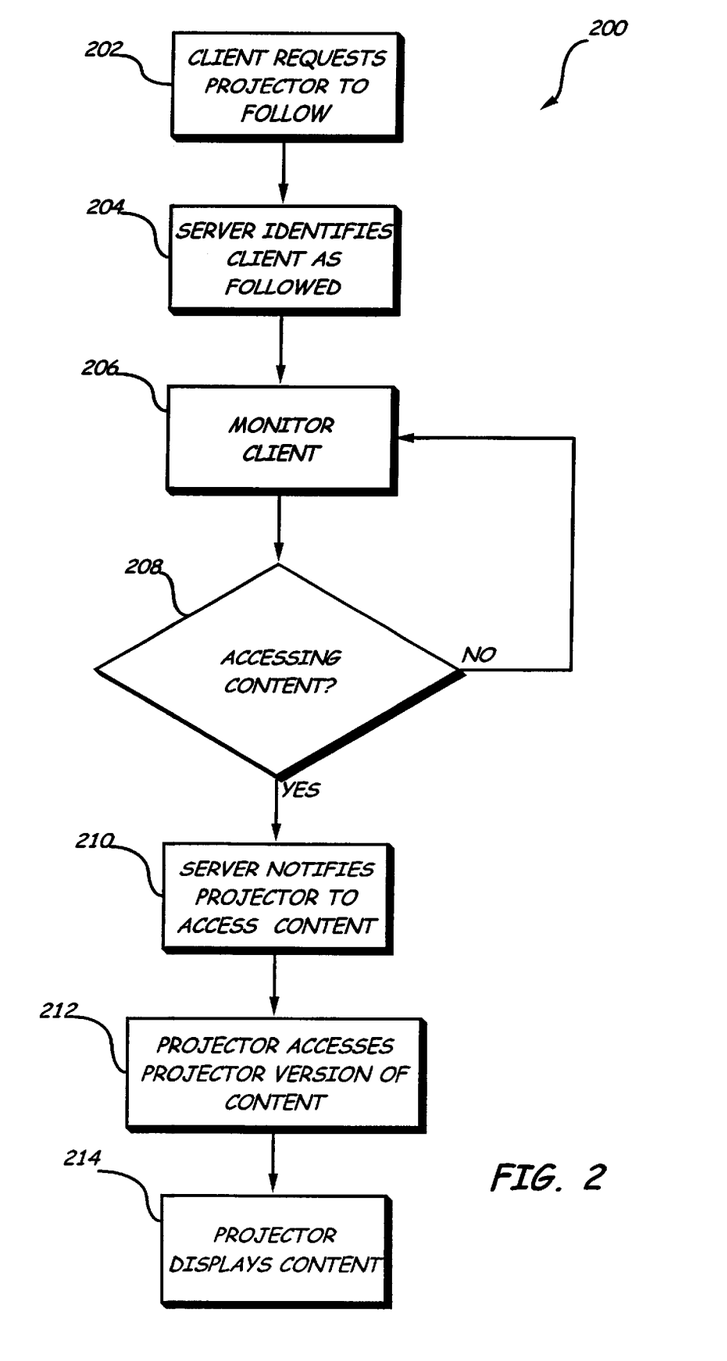
FIG. 2 is a flow diagram illustrating an exemplary method for displaying content accessed by a client device via a projector in accordance with an exemplary embodiment of the present invention.
Figure 3:
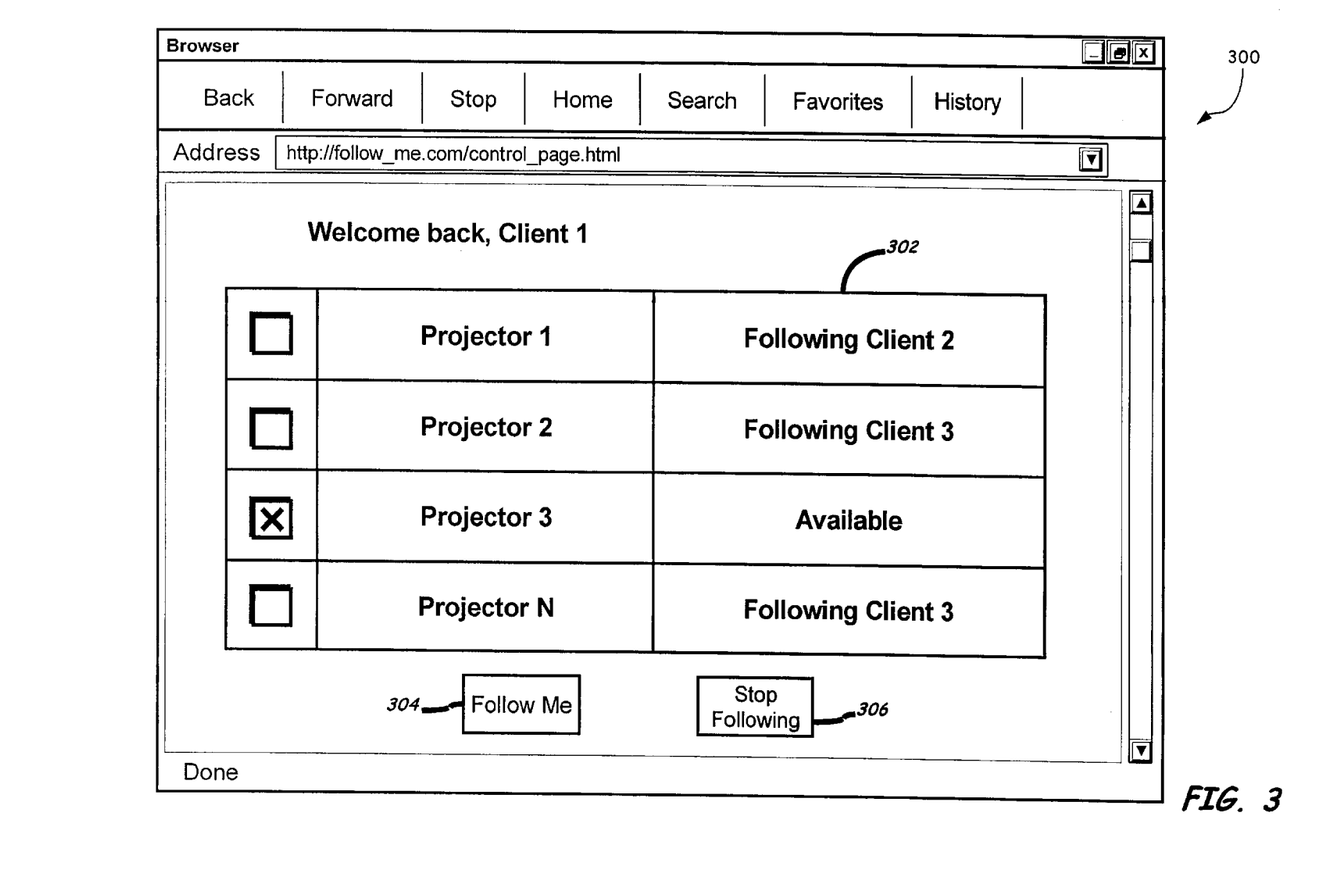
FIG. 3 is a diagrammatic view illustrating a control page for identifying projectors to follow a particular client.

Referring now to FIG. 2, an exemplary method in accordance with the present invention is described. The method 200 allows content accessed by one or more clients through a network, such as the Internet, an Intranet, or the like, to be displayed to an audience via one or more following projectors. In an exemplary embodiment, the method is initiated when a client provides a request to the server that one or more projector(s) "follow" the display of content by that client, that is, display the content accessed by the client 202. These projectors are then identified as "following" projectors for the requesting client by the server 204 until they are requested to no longer follow the client or until they are requested to follow a second client. For example, the client may navigate to a control page provided by the server via the network. The control page may allow the client to interactively select projectors that should follow the browsing activity of the client. FIG. 3 illustrates an exemplary control page 300. This control page 300 provides the status of projectors within the system and allows client users to select and deselect projectors to follow the client. In the embodiment shown, this is accomplished by selecting the appropriate projectors from a table 302 within the page 300 and actuating either the control "Follow Me" 304 to add one or more following projectors, or "Stop Following" 306 to delete one or more following projectors. It will be appreciated that the control page 300 shown in FIG. 3 is exemplary in nature. Thus, it is contemplated other control page configurations may be provided without departing from the scope and spirit of the present invention. Once the following projectors for the client are identified 204, the server thereafter monitors the browsing activity of that client for detecting when the client is accessing content pages via the network 206. When the client accesses a new content page via the network 208, for example, the client version of that content, the server notifies the following projector(s) that the client is accessing the content 210. The following projector (s) access the projector version of the content via the network 212 whereupon the content may be displayed by the projector(s) 214.

Referring again to FIGS. 1A, 1B and 1C, in exemplary embodiments, the method described in the discussion of FIG. 2, may be implemented as a server side program of instructions or software employing two basic routines: a "sender" routine resident on the server 112 and a "receiver" routine resident on each projector 114, 116 & 118. The sender routine is comprised of an interface and network address parameters (in one embodiment, an IP (Internet Protocol) address and port number) for the projector. When the interface is invoked, the sender routine opens a socket with the specified address projector 114, 116 & 118 and sends a command string to the projector 114, 116 & 118 instructing its browser to navigate to and display the content accessed by the client or clients 102, 104, 106 & 108 it is following. The receiver routine likewise includes an interface and network address component (a port number) specifying the network port to be monitored. When the receiver interface is invoked, the receiver monitors the specified port for receipt of a command string from the sender routine. The receiver, upon receiving the command string instructing its browser to navigate to and display the content accessed by the client or clients 102, 104, 106 & 108 it is following, decodes the command string, and causes it to be executed.

In exemplary embodiments, sender routines may be implemented as a COM object using C++ allowing the sender routines to be easily controlled from an ASP. Such embodiments are well suited for use with the Microsoft® Internet Information Server produced by Microsoft Corporation (Microsoft is a registered trademark of Microsoft Corporation, Redmond, Wash.). However, it will be appreciated that the sender routine may alternately be implemented using other languages such as C or Java® (Java is a registered trademark of Sun Microsystems, Inc.) and controlled using a CGI (Common Gateway Interface). In such embodiments, the sender and receiver routines may communicate over a socket for providing platform independence. In this manner, the receiver routines may be implemented in languages such as Java, C++, and the like. It will be appreciated by those of ordinary skill in the art that the sender and receiver routines may also be implemented so as to communicate using alternate protocols such as, for example, DCOM or RMI, and that such implementation would not depart from the scope and spirit of the present invention.

Receiver routines running on projectors 114, 116 & 118 await the receipt of a command string from the sender routine running on the server 112 for instructing the projector's browser to navigate to and display the content accessed by the client or clients 102, 104, 106 & 108 being followed. Content on the server 112 includes command script for controlling which projectors 114, 116 & 118 are following particular clients 102, 104, 106 & 108. Preferably, this command script also invokes the interface on the sender, causing the projectors 114, 116 & 118 to follow the designated clients 102, 104, 106 & 108. In exemplary embodiments, the command script may be implemented using a suitable scripting language, such as Visual Basic Scripting Edition (VBScript), JavaScript for Visual Basic, or the like.

In exemplary embodiments, the command script includes a data structure comprised of a list of projectors associating each projector 114, 116 & 118 with the client or clients 102, 104, 106 & 108 that projector 114, 116 & 118 is following. This list is revised each time a client 102, 104, 106 & 108 requests that one or more projectors 114, 116 & 118 follow the client's browsing session. For example, the list may be updated each time a client navigates to a control page provided by the server 112 (e.g., control page 300 (FIG. 3)) and selects projectors 114, 116 & 118 to follow that client 102, 104, 106 & 108. The list may also be updated programmatically by embedding a command script in one or more of the content pages (e.g., in the HTML) accessed by the clients 102, 104, 106 & 108. For example, in uses of the present invention wherein several clients each provide one or more portions of a single presentation which closely follows a predetermined story board, the command script may be embedded in the first page accessed by each client giving the presentation. Wherein the scripting language used is VBScript, the first content pages accessed by "Clients 2" 104 and "Client 3" 106 giving such a presentation may include the following command scripts:

```
Client 2_StartPage.asp
<!-- #include file + "common.asp" -->
<%
FollowMe Projector1
ShowPage
%>
<HTML>
.
</HTML>
``` and

```
Client_3_StartPage.asp
<!-- #include file + "common.asp" -->
<%
FollowMe Projector2
FollowMe Projector3
ShowPage
%>
<HTML>
.
</HTML>
``` which cause "Projector 1" 114 to follow "Client 2" 104 while "Projector 2" 116 and "Projector 3" 118 follow "Client 3" 106 when those clients navigate to their respective start pages "Client_2_StartPage.asp" and "Client_3_StartPage.asp."

In exemplary embodiments, command scripts may further include subroutines for updating the list of projectors thereby identifying the projector or projectors 114, 116 & 118 to follow specific ones of clients 102, 104, 106 & 108, and for notifying the projectors 114, 116 & 118 following clients 102, 104, 106 & 108 to display the content accessed by the clients being followed. For instance, the exemplary command scripts set forth above include subroutines labeled "FollowMe" and "ShowPage" for performing these functions. Because projectors 112, 114 & 116 may display the same content as the clients 102, 104, 106 & 108 they follow, it is desirable to prevent the command script from servicing calls from projectors 112, 114 & 116 as clients. In this manner, a possible continuous loop wherein a projector continually commands itself to display the content page it is already displaying may be avoided. For example, the subroutines "FollowMe" and "ShowPage" may use the VBScript command string "Request.ServerVariables ("REMOTE_HOST")" for determining which device (client or projector) is calling them.

Figure 4:
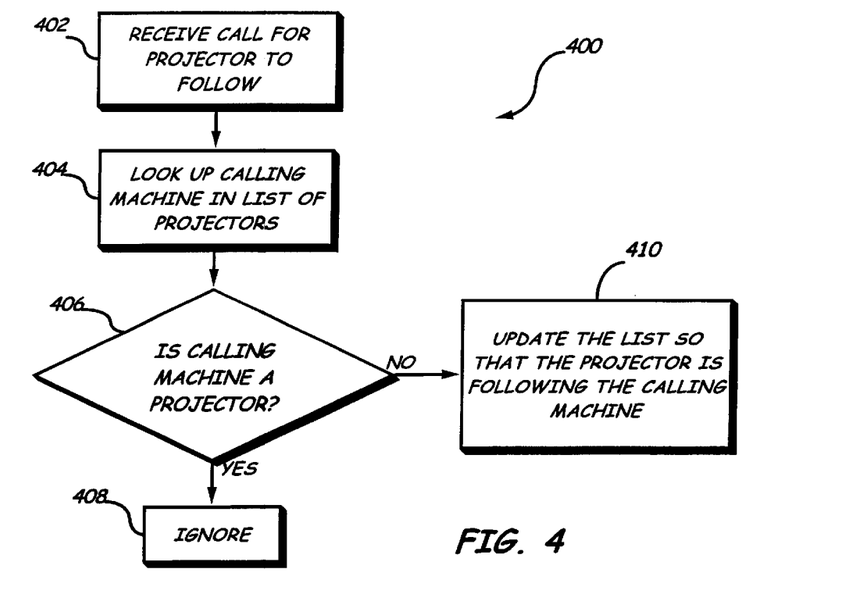
FIG. 4 is a flow diagram illustrating an exemplary method for identifying a client to be followed by one or more projectors.

FIG. 4 illustrates an exemplary method implemented by a subroutine of the command script (e.g., in the example above, the "FollowMe" subroutine) for assigning projectors to follow specific clients by updating the list of projectors. Such subroutines are utilized when the command script is embedded in one or more of the content pages (e.g., in the HTML) accessed by the clients so that the list of projectors is updated programmatically. The method 400 first determines if the device or machine requesting the assignment (the "calling machine") is a projector or client device thereby preventing the command script from servicing a call from a projector. The method 400 is initiated when the command script receives a call from a calling machine for a following projector 402. The identity of the calling machine is next looked up on the command script's list of projectors for determining if the calling machine is a projector or client 404. If the calling machine is determined to be a projector 406, the call is ignored and the list of projectors is not updated 408. In this manner, the command script is prevented from servicing a call from a projector. If, however, the calling machine is determined not to be a projector (i.e., the calling machine is a client), the list is updated by assigning the requested projector to follow the calling machine (i.e., the client) 410.

Figure 5:
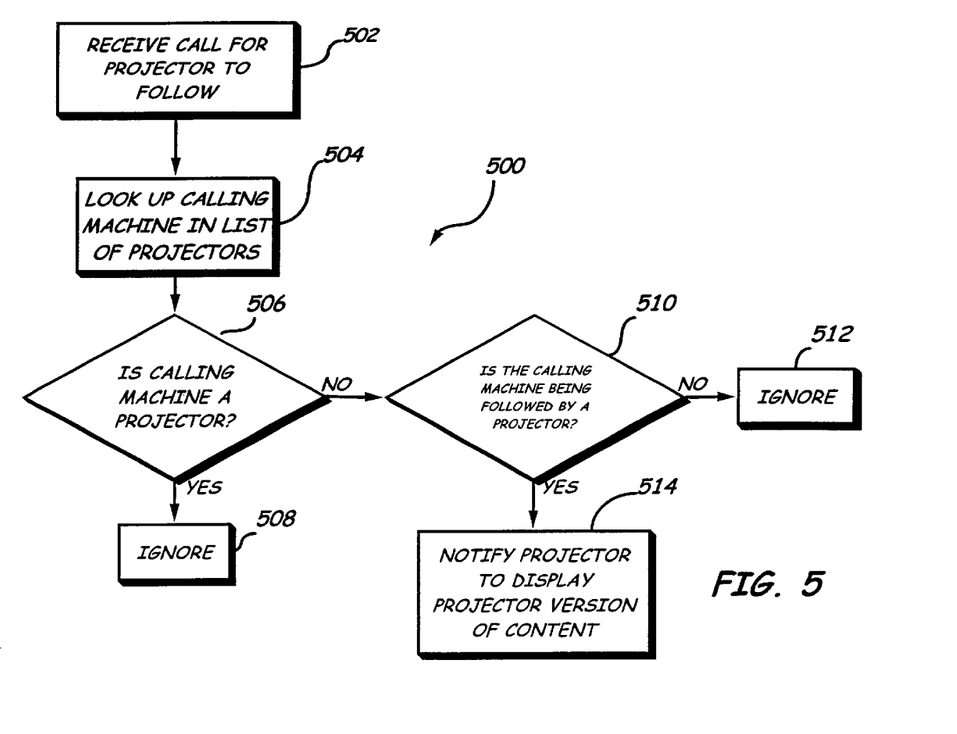
FIG. 5 is a flow diagram illustrating an exemplary method for instructing the projectors following a particular client to display the content accessed by that client.

FIG. 5 illustrates an exemplary method implemented by a subroutine of the command script (e.g., in the example above, the "ShowPage" subroutine) for notifying following projectors to display the content accessed by the clients being followed. This method 500, like the method 400 shown in FIG. 4, also first determines if the device or machine requesting the assignment (the "calling machine") is a projector or client device for preventing the command script from servicing a call from a projector. The method 500 is initiated when the command script receives a call from a calling machine for a following projector to access and display content 502. The identity of the calling machine is next looked up on the command script's list of projectors for determining if the calling machine is a projector or client 504. If the calling machine is determined to be a projector 506, the call is ignored and no action is taken 508. In this manner, the command script is prevented from servicing a call from a projector. If, however, the calling machine is not a projector, the calling machine is determined to be a client and a second determination is made whether the calling machine is being followed by a projector or projectors 510. If it is determined that the calling machine is not being followed by a projector, no action is taken and the call is ignored 512. If, on the other hand, it is determined that the calling machine is being followed by a projector or projectors, each projector following the client is notified to navigate to and display the projector version of the content accessed by the calling machine (client) 514.

In an exemplary embodiment, wherein the scripting language used is VBScript and the command script includes the subroutine "ShowPage," every content page to be displayed by a projector (i.e., the projector version of the content page) may include a script such as:

```
<!-- #include file = "common.asp" -->
<%
ShowPage
%>
``` wherein the file "common.asp" contains the "ShowPage" subroutine definition and the "#include" directive is used for eliminating duplication. In this embodiment, the "ShowPage" subroutine invokes the interface of the sender routine for notifying the associated following projector that it should navigate to and display the content accessed by the client or clients it is following. The "ShowPage" subroutine may utilize the VBScript command string "Request.ServerVariables("URL")" for determining from what page it is being called.

Figure 6A:
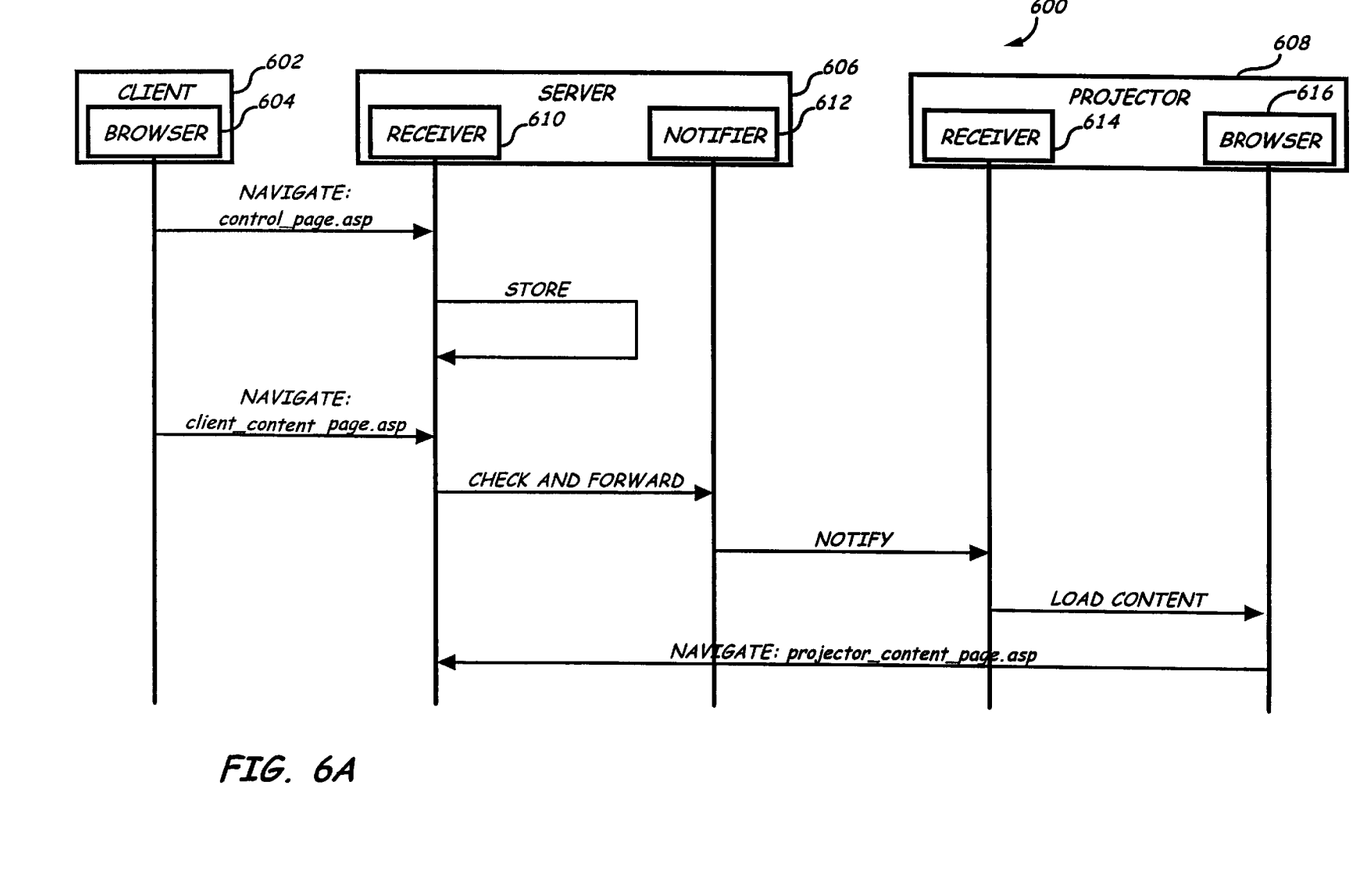
FIG. 6A is a timing diagram illustrating the display of content accessed by a client device via a projector in accordance with an exemplary embodiment of the present invention.
Figure 6B:
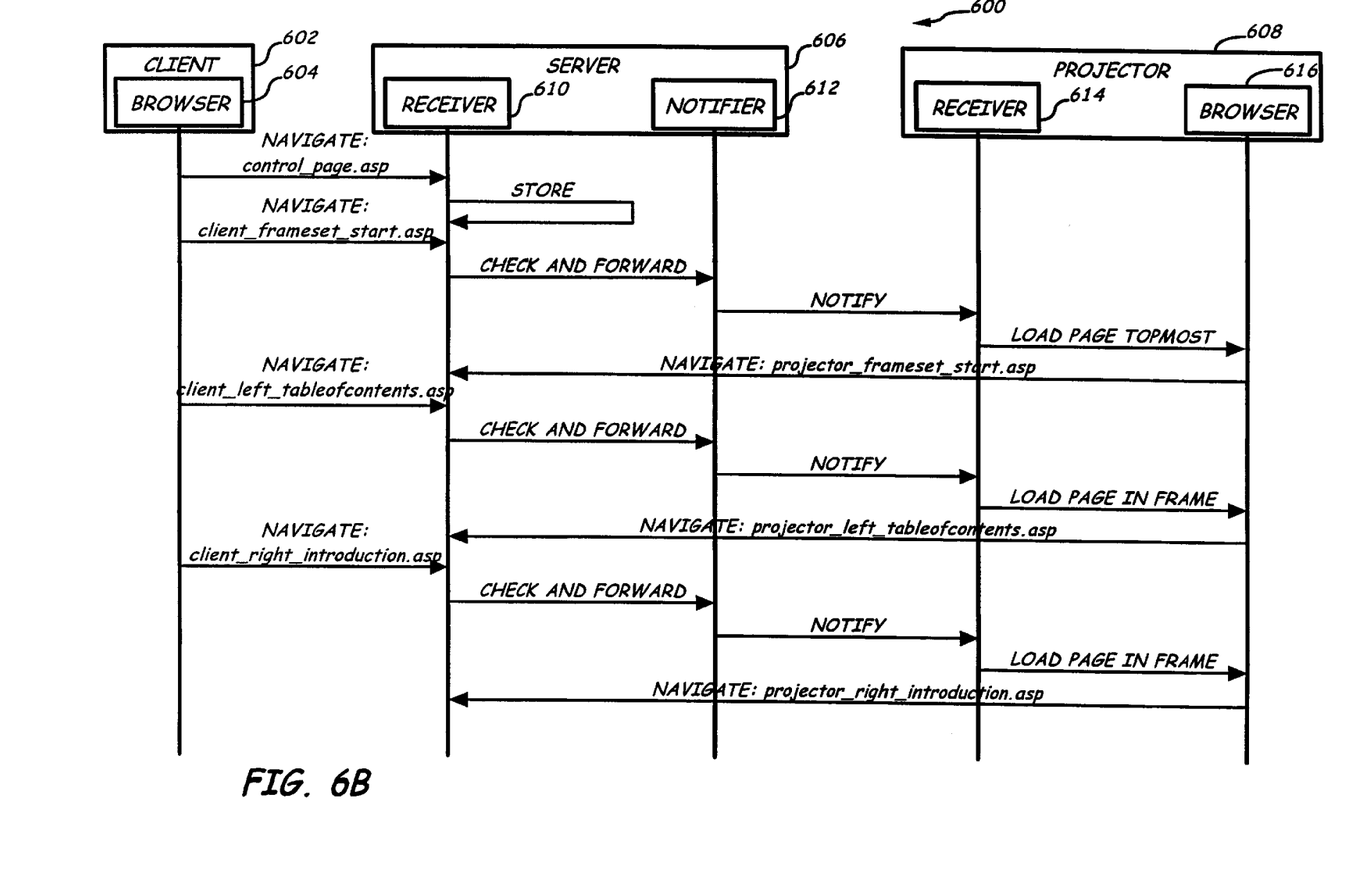
FIG. 6B is a timing diagram illustrating the display of content having two or more frames.

Referring now to FIGS. 6A and 6B, operation of an exemplary embodiment of the present invention with respect to one client is described.

In FIG. 6A, operation of the present invention for the display of content such as a Web page or the like that does not contain multiple frames is described. As illustrated, a client 602 operating browser 604 navigates to a control page (e.g., "control_page.asp"). This control page (e.g., "control_page.asp") has encoded an indication to the server 606 that one or more particular projectors, for example, projector 608 should follow the client 602. In response to this encoded indication, server 606 stores the address, (e.g., the Internet Protocol (IP) address) of the client 602. Preferably, this address is obtained from the request of the client browser 604 for server 606 to deliver the control page (e.g., "control_page.asp") to client 602, designating the client 602 as "followed."

Client 602, having been designated as "followed" by server 606, next directs browser 604 to navigate to a content page. The client 602 may load a client version of this page, in this example, e.g., "client_content_page.asp." Receiver 610 of server 606 recognizes that followed client 602 is loading a new content page and informs projector notifier 612. In response to such notification, projector notifier 612 opens a socket to projector 608 and sends a message directing the projector 608 to load the projector version of the content page accessed by the client 602. Receiver 614 receives the message from projector notifier 612, and, parsing the uniform resource locator (URL) of the new content page, causes the projector's browser 616 to load the content page accessed by the client 602. The projector version of the content page (e.g., "projector_content_page.asp") is then loaded by the projector's browser from server 606 for display by the projector 608.

In FIG. 6B, operation of the present invention for the display of content such as a Web page, or the like containing multiple frames is described. When browsers 604 or 616 load a content page, such as a Web page identified by a URL, it is generally loaded into the browser's main window. Thus, when the content being accessed by client 602 includes framesets, it is desirable that additional information be provided to the browser 608 so that the content may be loaded into the correct frame within the browser window. In accordance with an exemplary embodiment of the present invention, this may be accomplished by embedding a frame name within the file name (e.g., URL) of the content to be loaded in each frame. For example, assuming a frameset defining two frames named "left" and "right", respectively, content, for example an introduction to the content page, to be loaded within the right frame may be identified by the file name "right_introduction.asp," while content, for example, a table of contents, to be loaded into the left frame may be identified by the file name "left_tableofcontents.asp." In this manner, the file name may be parsed (e.g., by the command script subroutine "ShowPage") so as to command the projector browser 616 to load the content correctly. Similarly, if it was desired to load a content page in a topmost frame of the browser display, a frame name such as "topmost" may be added to the file name. Thus, a welcome loaded into the topmost frame of the browser display may have a file name such as "topmost_welcome.asp" or the like.

As illustrated, a client 602 operating browser 604 navigates to a control page (e.g., "control_page.asp"). This control page (e.g., "control_page.asp") has encoded an indication to the server 606 that one or more particular projectors, for example, projector 608 should follow the client 602. In response to this encoded indication, server 606 stores the address, (e.g., the Internet Protocol (IP) address) of the client 602. Preferably, this address is obtained from the request of the client browser 604 for server 606 to deliver the control page (e.g., "control_page.asp") to client 602, designating the client 602 as "followed."

Client 602, having been designated as "followed" by server 606, next directs browser 604 to navigate to a new content page, in this example a page containing a frameset defining two frames named respectively "left" and "right." The client 602 may load a client version of the frameset of this content page (e.g., "client_frameset_start.asp"). Receiver 610 of server 606 recognizes that the followed client 602 is loading a new content page and informs projector notifier 612. In response to such notification, projector notifier 612 opens a socket to projector 608 and sends a message directing projector 608 to load the projector version of the client page, being the frameset. Receiver 614 receives the message from projector notifier 612, and, parsing the uniform resource locator (URL) of the new content page, causes projector browser 616 to load the frameset (e.g., "projector_frameset_start.asp"), topmost, which frameset is loaded to projector browser 616 from server 606. Next, the client browser 604 loads the appropriate source HTML (Hypertext Markup Language) page for one of its frames from server 606, in this case the "left" page (e.g., "client_left_tableofcontents.asp"). Receiver 610 of server 606 detects that the followed client 602 is loading a page and informs projector notifier 612. In response, the projector notifier 612 opens a socket to projector 608 and sends a message directing the projector 608 to load the projector version of the client page. Receiver 614 of projector 608 receives this message and, parsing the URL for the page, causes the projector browser 616 to load the projector version of the HTML page, in this case the "left" page (e.g., "projector_left_tableofcontents.asp"), into the correct frame. In response, projector browser 616 loads the page into the correct frame.

In a similar fashion, loading of the HTML page for the "right" frame (e.g., "client right_introduction.asp") from web server 606 by browser 604 of client 602 will cause server 606 to notify projector 608 via projector notifier 612 that projector browser 616 should load the projector version of the HTML page for the "right" frame (e.g., "projector_right introduction.asp") into the correct frame. In this fashion, the entire display of content provided by browser 604 of client 602 may be presented and displayed by projector 608 using server side technology, once client 602 is designated as "followed."

Turning again to FIGS. 1A and 1B, in view of the foregoing, it will be evident to those skilled in the art that, once server 112 delivers a control page as described above to one of clients 102, 104, 106 & 108, that client will be designated as "followed" by one or more of projectors 114, 116 & 118, and the display from the followed client 102, 104, 106 & 108 will be rendered by the following projectors 114, 116 & 118.

Referring again to FIGS. 6A and 6B, it will be appreciated by those skilled in the art, depending upon different implementations of the present invention, that the control page accessed by a "followed" client 602, or alternately a second control page, may also serve the purpose of indicating to server 606 that projector 608 need no longer follow client 602. In the foregoing embodiment, the user directs the system 600 to follow a client 602 by directing the client's browser 604 to a control page indicating the client 602 is to be followed, and, similarly, the user directs the system 600 to cease following the client 602 by again directing the client's browser 604 to that control page (or alternately a second control page) that indicates the client 602 is no longer to be followed.

In embodiments of the invention, access of a control page by a second or different client from client 602 may cause the system 600 to designate that client as the new "followed" client to be followed by projector 608. Thus, client 602 is no longer followed. In such an embodiment, the client to be followed is controlled simply by directing the browser 604 of that client 602 to the address of the control page.

In the case where projector 608 is following a given client 602 and a second client accesses the control page, embodiments of the present invention may permit the simultaneous display of a plurality of content pages, each pertaining to one of a plurality of "followed" clients, as follows. It will be recalled that when client browser 604 requests server 606 to display a control page, the address (e.g., IP address) of the client 602 is noted by the server 606. In this manner, the server 606 is able to recognize requests for pages by the client browser 602 from server 606 as coming from a "followed" client. In embodiments of the invention permitting the simultaneous display of pages from a plurality of clients 602, the projector browser 616 may be configured so that pages from different followed clients, indicated by their different and unique addresses (e.g., IP addresses), are rendered in different areas of the projector's display such that each area is dedicated to rendering the display of one "followed" client 602. The allocation of a number of discrete screen areas in a display of content, whether by windowing, by tiling or by other presentation methods, is well known and may be practiced without undue experimentation by those of ordinary skill in the art.

Figure 7:
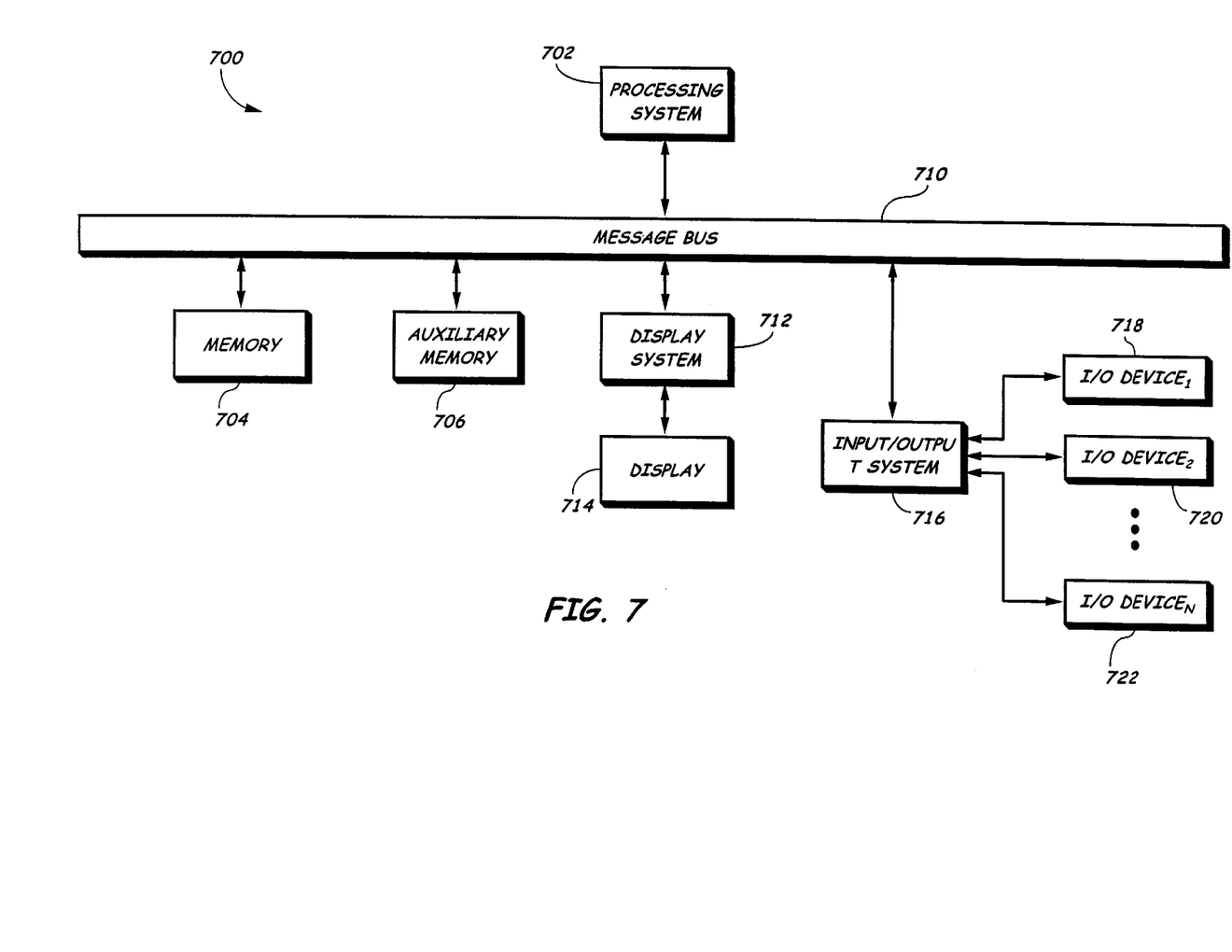
FIG. 7 is a block diagram illustrating an exemplary information appliance suitable for implementation of the system and method of the present invention.

The present invention may be implemented as programs of instructions resident in the memory of one or more information appliances configured generally as described in FIG. 7. For example, in an exemplary embodiment, elements of the present invention may be implemented as an ancillary program of instructions or "plug-in" for a "browser" or "server" application employed by the information appliance. Until required by the information appliance, the set of instructions may be stored in another readable memory device, for example in a hard disk drive or in a removable memory such as an optical disk for utilization in a CD-ROM drive or a DVD drive, a floppy disk for utilization in a floppy disk drive, a personal computer memory card for utilization in a personal computer card slot, or the like. Further, the program of instructions can be stored in the memory of another information appliance and transmitted over a local area network or a wide area network, such as the Internet, an Intranet, or the like, when desired by the user. Additionally, the instructions may be transmitted over a network in the form of an applet that is interpreted or compiled after transmission to the information appliance rather than prior to transmission. One skilled in the art would appreciate that the physical storage of the sets of instructions or applets physically changes the medium upon which it is stored electrically, magnetically, chemically, physically, optically or holographically so that the medium carries computer readable information.

Referring now to FIG. 7, a hardware system in accordance with the present invention is shown. The hardware system 700 shown in FIG. 7 is generally representative of the hardware architecture of an information appliance suitable for implementing the present invention. In one embodiment, the hardware system 700 may comprise a convergence system, PC/TV system or the like, so named because such systems represent the convergence of computer and consumer electronics into a single system. Alternately, the hardware system, or portions thereof, may be part of an information appliance providing a specific media. Examples of such appliances include televisions, VCR devices, DVD devices, Web TV devices, satellite receivers, cable boxes and the like.

The hardware system 700 is controlled by a central processing system 702. The central processing system 702 includes a central processing unit such as a microprocessor or microcontroller for executing programs, performing data manipulations and controlling the tasks of the hardware system 700. Communication with the central processor 702 is implemented through a system bus 710 for transferring information among the components of the hardware system 700. The bus 710 may include a data channel for facilitating information transfer between storage and other peripheral components of the hardware system. The bus 710 further provides the set of signals required for communication with the central processing system 702 including a data bus, address bus, and control bus. The bus 710 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of the hardware system 700 include main memory 704 and auxiliary memory 706. The hardware system 700 may further include an auxiliary processing system (not shown) as required. The main memory 704 provides storage of instructions and data for programs executing on the central processing system 702. The main memory 704 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and so on. The auxiliary memory 706 provides storage of instructions and data that are loaded into the main memory 704 before execution. The auxiliary memory 706 may include semiconductor-based memory such as read-only memory (ROM), programmable read-only memory (PROM), erasable programmable read-only memory (EPROM), electrically erasable read-only memory (EEPROM), or flash memory (block oriented memory similar to EEPROM). The auxiliary memory 706 may also include a variety of non-semiconductor-based memories, including but not limited to magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), etc. Other varieties of memory devices are contemplated as well. The hardware system 700 may optionally include an auxiliary processing system (not shown) which may be an auxiliary processor to manage input/output, an auxiliary processor to perform floating point mathematical operations, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. It will be recognized that such auxiliary processors may be discrete processors or may be built in to the main processor.

The hardware system 700 further includes a display system 712 for connecting to a display device 714, and an input/output (I/O) system 716 for connecting to one or more I/O devices 718, 720, and up to N number of I/O devices 722. The display system 712 may comprise a video display adapter having all of the components for driving the display device, including video memory, buffer, and graphics engine as desired. Video memory may be, for example, video random access memory (VRAM), synchronous graphics random access memory (SGRAM), windows random access memory (WRAM), and the like. The display device 714 may comprise a cathode ray-tube (CRT) type display such as a monitor or television, or may comprise an alternative type of display technology such as a projection-type CRT display, a liquid-crystal display (LCD) overhead projector display, an LCD display, a light-emitting diode (LED) display, a gas or plasma display, an electroluminescent display, a vacuum fluorescent display, a cathodoluminescent (field emission) display, a plasma-addressed liquid crystal (PALC) display, a high gain emissive display (HGED), and so forth. The input/output system 716 may comprise one or more controllers or adapters for providing interface functions between the one or more I/O devices 718–722. For example, the input/output system 716 may comprise a serial port, parallel port, universal serial bus (USB) port, IEEE 1394 serial bus port, infrared port, network adapter, printer adapter, radio-frequency (RF) communications adapter, universal asynchronous receiver-transmitter (UART) port, etc., for interfacing between corresponding I/O devices such as a keyboard, mouse, trackball, touchpad, joystick, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, etc. The input/output system 716 and I/O devices 718–722 may provide or receive analog or digital signals for communication between the hardware system 700 of the present invention and external devices, networks, or information sources. The input/output system 716 and I/O devices 718–722 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system 700 of FIG. 7 by one having ordinary skill in the art would not depart from the scope or the spirit of the present invention.

In exemplary embodiments, the methods disclosed may be implemented as sets of instructions such as software or firmware readable by an information appliance as described in the discussion of FIG. 7. It is understood that the specific order or hierarchies of steps in the methods disclosed are examples of exemplary approaches. Based upon design preferences, it is understood that the specific order or hierarchy of steps in the method can be rearranged while remaining within the scope of the present invention. The attached method claims present elements of the various steps in a sample order, and are not meant to be limited to the specific order or hierarchy presented.

It is believed that the system and method of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A system for displaying content accessed by a client through a network via a projector, the content including a client version suitable for access by said client and a projector version suitable for display by said projector, comprising:

a server coupled to the network, said server being capable of communication with said client via the network;

said projector communicatively coupled to said server, said projector being capable of accessing the projector version of the content;

said client and said projector each comprising a browser for accessing said content;

wherein, upon receiving a request from said client that said projector display the content accessed by the client, said server is capable of thereafter detecting when said client is accessing the client version of the content and notifying said projector to access the projector component of the content via the network whereupon the content may be displayed by said projector, the server determining that the request is not received from a projector by receiving a call from a calling machine and determining if the calling machine is in a list maintained by the server, and if the calling machine is not in the list, determining that the calling machine is a client and updating the list so that the requested projector displays content accessed by the client.

2. The system as claimed in claim 1, wherein said projector is communicatively coupled to said server via said network.

3. The system as claimed in claim 1, wherein said server provides a control page accessible by said client via said network, wherein said control page is suitable for requesting that said projector display content accessed by said client.

4. The system as claimed in claim 3, wherein said control page includes a script suitable for requesting that said projector display content accessed by said client.

5. The system as claimed in claim 1, wherein said server includes a sender routine and said projector includes a receiver routine said sender and receiver routine for communicating a command string between said server and said projector.

6. The system as claimed in claim 1, wherein said network comprises the Internet and said content comprises a Web page on the World Wide Web (WWW).

7. A method for displaying content accessed through a network by a client via a projector, the content including a client version suitable for access by the client and a projector version suitable for display by the projector, the method comprising:

receiving a request from the client that the projector display content accessed by the client and determining that the request is not received from a projector by receiving a call from a calling machine;

determining if the calling machine is in a list maintained by the server; and if the calling machine is not in the list, determining that the calling machine is a client and updating the list so that the requested projector displays content accessed by the client;

determining that the client is accessing the client component of the content; and notifying the projector that the client is accessing the content, whereupon the projector accesses and displays the projector component of the content.

8. The method as claimed in claim 7, wherein the step of receiving a request from the client comprises providing a control page on said network, said control page being accessed by said client to provide said request.

9. The method as claimed in claim 7, wherein the step of receiving a request from the client comprises receiving a script suitable for requesting that said projector display content accessed by said client.

10. The method as claimed in claim 7, further comprising the step of causing said projector to display said content within a frame.

11. The method as claimed in claim 7, wherein said step of notifying the projector comprises opening a socket between the server and the projector.

12. The method as claimed in claim 11, wherein said socket is opened by a sender routine resident on the server and a receiver routine resident on the projector.

13. The method as claimed in claim 7, wherein said network comprises the Internet and said content comprises a Web page on the World Wide Web (WWW).

\* \* \* \* \*